Patented Dec. 12, 1933

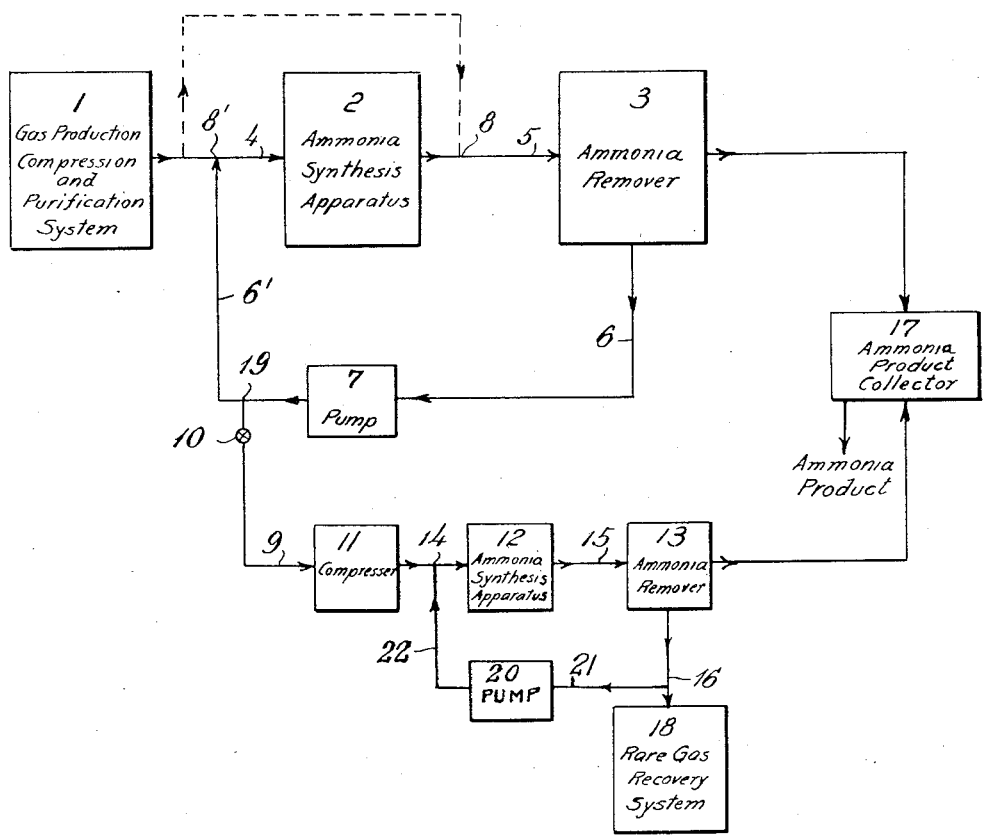

1,938,598

UNITED STATES PATENT OFFICE 1,938,598

PROCESS FOR AMMONIA SYNTHESES

Henry S. Loud, Syracuse, N. Y., assignor to Atmospheric Nitrogen Corporation, New York, N. Y., a corporation of New York Application November 6, 1928. Serial No. 317,667

10 Claims. (Cl. 23—199)

This invention relates to the catalytic synthesis of ammonia from nitrogen and hydrogen gases under pressure and particularly to a so-called cyclic process; that is, a process in which the nitrogen-hydrogen gas is repeatedly circulated over the same body or bodies of ammonia catalyst material, the ammonia product being removed between successive contacts of the circulating gas with the catalyst and fresh or make-up nitrogen-hydrogen gases introduced into the cyclic gas circulatory system to compensate for the gas removed as ammonia or otherwise.

It has been proposed to operate ammonia synthesis process at various pressures ranging all the way from below 100 atmospheres to above 1000 atmospheres. Since only a relatively small portion of nitrogen-hydrogen gas is converted into ammonia during a single period of contact with a body of the ammonia catalyst material at the lower pressures, particularly below about 250 atmospheres, practical operation at these pressures involves a cyclic circulatory system in which during a single period of contact with the catalyst only a portion of the nitrogen-hydrogen gas is synthesized to ammonia and the residual unconverted gas is recirculated into repeated contact with the catalyst in order that it may not be wasted. The method generally employed is to recirculate the unconverted gas, after removal of the ammonia product, over the same catalyst body and to introduce into the cyclic gas circulatory system fresh nitrogen-hydrogen gases to compensate for that removed as product. The operation therefore involves a closed circulatory system at one or more points in which nitrogen and hydrogen gases are removed as ammonia, and at some other point in which corresponding amounts of fresh nitrogen-hydrogen gases are introduced so that a relatively constant gas condition exists in the system at all times.

There is another condition which must be provided for in a cyclic system; that is, the presence of impurities or the so-called inerts in the nitrogen-hydrogen gas, for example argon and methane. It is evident that these inerts, even though present in the fresh gas in quite small amounts, will tend to build up continuously in the closed circulatory system, and that the amount of such would soon become so large as to interfere with the ammonia synthesis unless means are provided for their removal. The usual means is to discharge or "bleed" a portion of the circulating gas from the gas circulatory system at intervals or continuously and release the pressure of the discharged gas. This gas, being higher in inerts than the fresh incoming gas, will offset the cumulative effect of the latter. The amount of this "bleeder" gas will depend on the inert content of the fresh gas and the amount practically permissible in the synthesis system. For example, if the two figures are .5% and 5% respectively, the bleeder gas will amount to about 10% of the total fresh or make-up gas. It is evident that the bleeder gas removed from the ammonia synthesis system, represents an important economic loss in that it is a gas rich in hydrogen and which has been subjected to the various preparatory steps of compression and purification in connection with the ammonia process. Heretofore, this gas has been a complete loss with respect to ammonia production since neither its nitrogen nor its hydrogen content nor its state of compression could be utilized.

In terms of the above example, the loss of gas limits the process to an efficiency of only about 90%. The problem becomes increasing acute with any increase in the inert content of the initial gases. Referring again to the above example, if the inert content of the fresh gas increased to 7% only, the bleeder gas would then equal 14% of the total in order to maintain the inert content of the circulating gas at 5%. Or, if it were practicable to operate with the inert content of the circulating system as high as 10%, even then the volume of bleeder gas would amount to about 5% of the total fresh gas if the latter contained .5% inerts and to 7% if the fresh gas contained .7% inerts.

This factor has heretofore prevented the use of a nitrogen-hydrogen gas containing any substantial amount of inert constituents and particularly has made the use of bituminous coal as distinguished from the more expensive coke for the production of the hydrogen gas impracticable. The methane content of hydrogen gas (water or producer gas) made from bituminous coal, although constituting but a small percentage of the gas, is still enough to necessitate prohibitive bleeding from the ammonia synthesis system.

A process has now been devised whereby a gas containing inert constituents may be efficiently utilized for the production of synthetic ammonia. The present invention provides for increased ammonia production from a given amount of nitrogen-hydrogen gas, and makes possible the use in connection with ammonia synthesis of gases and gas production methods not heretofore applicable to such a process. The process comprises the use of two different pressures at different stages, the second pressure being substantially higher than the first. It involves a cyclic ammonia synthesis system operated at the first or lower pressure. A portion of the gas circulating through such a system, without release of its pressure, is brought to a much higher pressure—for example, above 500 atmospheres, and then subjected to catalytic ammonia synthesis at this high pressure. The unfavorable effect of the inert content of the gas is more than offset by the effect of the increased pressure so that a substantial conversion of its nitrogen-hydrogen content into ammonia is obtained. After removal of this ammonia, the residual gas, if desired, may be subjected, still under its high pressure condition, to a further ammonia catalytic treatment for conversion of still more of its nitrogen and hydrogen into ammonia and the relatively small amount of residual unconverted gas then discharged from the synthesis system thereby removing the inert constituents of gas introduced into the circulatory synthesis system. As distinguished from the old type of cyclic process where the inerts are removed by discharging or "bleeding" a portion of the compressed nitrogen-hydrogen gas directly from the process, I interpose a second synthesis treatment at a higher pressure to which all nitrogen-hydrogen gas is subjected before its release from the process. Fresh nitrogen-hydrogen gas is introduced into the cyclic system to replace the gas there converted and the portion of the circulating gas which is compressed and subjected to ammonia synthesis at a higher pressure.

By this process which includes ammonia synthesis at both low pressure and high pressures, the advantages of each are obtained and each is used to supplement the other with resulting advantages peculiar to the combination. Low pressure synthesis, which is the best for large scale production, is used for the treatment of the initially large gas volumes and for the production of the major portion of the ammonia product. High pressure synthesis is used for a relatively small fraction of the total gas volumes and for a gas the inert content of which is relatively high, for both of which conditions high pressure synthesis is particularly adapted. At the same time the amount of unconverted gas removed or discharged from the synthesis system is relatively small and the amount of ammonia product obtained correspondingly increased. Again, great freedom is possible in the operation of the low pressure cyclic system; it is not necessary to operate with a relatively high inert content of the circulating gas as heretofore; the fresh gases no longer need be so free from inert constituents; water gas as a source of the hydrogen may be made from bituminous coal instead of from coke. And finally the process results in a relatively high concentration of the argon content of the residual unconverted gas so that it is better adapted for argon recovery than the bleeder gas from the ordinary low pressure ammonia synthesis processes.

Other advantages will be apparent from a description of the accompanying drawing which illustrates diagrammatically one method of carrying out the invention.

Referring to the drawing, the numeral 1 indicates those portions of the apparatus prior to the ammonia synthesis system proper which in general are apparatus for manufacture of the crude nitrogen-hydrogen gas, for its compression to the desired pressure, and for its purification from constituents injurious to the ammonia catalyst to be used in the succeeding portion of the system. Such apparatus and the operation thereof are well known, and as nothing novel with respect thereto is necessarily involved in this invention, they need not be described further. The gas leaving 1 is a compressed gas containing nitrogen and hydrogen in proportions suitable for ammonia synthesis and substantially free from all constituents which might injuriously affect the ammonia catalyst, but still containing inert constituents. The numeral 2 indicates an apparatus wherein ammonia is synthesized which includes a vessel containing an ammonia catalyst; 3 is the apparatus for removal of ammonia from the converted gas whence the ammonia is passed to ammonia product collector 17; pipe connections 4, 5, 6, and 6' indicate the course of the gases and 7 is the pump which maintains the gas circulation through these pipes. 4, 2, 5, 3, 6, 7, 6' represents, then, the closed circulatory or cyclic stage of the process. The fresh gas from 1 is introduced into this system at any convenient point as 8 or 8'. If the ammonia remover 3 includes a liquefier so that the ammonia product is removed from the circulating gas as liquefied ammonia, it is preferred to admit the fresh gas into the system in front of the liquefier as at 8 instead of after the liquefier as at 8', thereby obtaining the purifying action of liquefied ammonia on the fresh gas described in the copending deJahn application 638,451, filed May 12, 1923, now Patent No. 1,815,243.

A portion of the gas circulating in the cyclic system is diverted, for example, at 19 and passes through pipe 9 to a compressor 11 where it is placed under a greatly increased pressure. The amount of gas thus diverted may be controlled by valve 10, or preferably by the rate of operation of compressor 11. The gas under increased pressure is subjected to a catalyst for the production of ammonia in the synthesis apparatus 12, and the ammonia formed by this treatment is removed in apparatus 13 and may be passed to ammonia collector 17. Pipe connections 14, 15 and 16 indicate the course of the gases, the residual unconverted gas being discharged from the synthesis system through pipe 16 to the rare gas recovery system 18. The apparatus designated by the numerals 11, 14, 12, 15, 13, 16 represent then the high pressure stage or portion of the process.

In the operation of the process shown in the drawing, the compressed fresh nitrogen-hydrogen gas from 1, preferably substantially pure with respect to catalyst poisons, but still containing appreciable amounts of inerts such as argon, methane, etc., is introduced into the cyclic system at 8 or 8'. This system operates at a relatively low pressure, for example 100—200 atmospheres. The gas in the cyclic system is continuously circulated by the pump 7 so that it passes through the synthesis apparatus 2 where ammonia is formed by contact with an ammonia catalyst and then through the ammonia removal apparatus 3 where ammonia formed in 2 is removed, and passed to ammonia product collector 17 for example as liquefied ammonia or as ammonia liquor depending upon the type of ammonia removal apparatus employed. The gas after ammonia removal is then returned to the ammonia catalyst through pipe connections 6, 6' and 4 for conversion of further quantities of the nitrogen and hydrogen constituents into ammonia. At the same time a portion of the gas circulating in the cyclic system is diverted at 19 and passes through pipe 9 in amount sufficient to maintain the inert content of the circulating gas in the cyclic system at a value satisfactory for ammonia synthesis under the conditions of temperature, gas velocity, pressure and catalyst existing in that system. An inert content of between 5 and 10 percent is particularly satisfactory. The introduction of the fresh gas at 8 or 8' is so regulated as to compensate for the gas removed as ammonia product, diverted at 19, or otherwise lost to the cyclic system, so that the pressure conditions in this cyclic system are maintained approximately constant for any given set of operating conditions.

The gas passing through 9, without release of its pressure condition, is compressed to a much higher pressure such as 500–1000 atmospheres by the compressor 11 and then passed into the synthesis apparatus 12 containing ammonia catalyst material where ammonia formation takes place. The ammonia containing gas passes into the ammonia removal system 13, where the ammonia is removed and passed to collector 17, and finally the residual gas, relatively high in inerts, leaves the synthesis system through pipe connection 16 and passes to the rare gas recovery system 18.

While in the preferred operation as hereinabove described the gas entering the synthesis system is substantially free from injurious impurities, this is not an essential condition. Subsequent purification in the synthesis system itself might be practiced, for example, by suitable purifying apparatus in the line 4 or 14.

Referring again to the drawing, details such for example as oil filters for the gas after the circulating pump or other purifying apparatus in the synthesis system, heat exchangers for the gas, etc., have obviously been omitted. The utility in an ammonia synthesis system of these and other details of a like general nature is understood by those skilled in the art and accordingly no particular description thereof is needed for a proper understanding of this invention. The drawing is diagrammatic. For example, the ammonia synthesis indicated by 2 may comprise only one catalyst vessel or more than one arranged in parallel or in series, with or without intermediate ammonia removal. Similarly, the ammonia synthesis at the higher pressure represented by 12 may comprise one or more catalyst vessels with or without intermediate ammonia removal, and the high pressure synthesis may be carried out in a cyclic system as in the case of the low pressure synthesis. Thus, gas passing through pipe 16 may be recirculated by means of a pump 20 through pipes 21, 22 and 14 to ammonia synthesis apparatus 12. The position of the circulating pump 7 with respect to the other apparatus is not limited to the particular arrangement of the drawing. Again there may be a complete duplication of the illustrated low pressure stage of the process and the gas diverted from the two low pressure apparatus units passed to compressor 11.

Although in the preferred example, as shown in the drawing, gas circulating in the cyclic system is diverted between the circulating pump and the ammonia synthesis apparatus the exact point where this diversion takes place is not an essential feature of my invention. For example, a portion of the gas leaving the apparatus 2 wherein ammonia is synthesized or leaving ammonia remover 3 may be passed to compressor 11. Furthermore, although the residual gas leaving the synthesis system is preferably treated to separately recover its constituents, it may be utilized in any other manner or wasted to the atmosphere.

Other modifications in the process described will be apparent to those skilled in the art and the scope of my invention is not limited except as defined in the claims.

I claim:

1. A process for the production of synthetic ammonia which comprises subjecting a nitrogen-hydrogen gas containing inert constituents to catalytic ammonia synthesis in a cyclic gas circulatory system under pressure, diverting a portion of the gas circulating in said system, compressing said diverted gas to a greatly increased pressure, and subjecting this compressed gas separately from the gas circulating in the aforesaid cyclic system to catalytic ammonia synthesis and ammonia removal.

2. A process for the production of synthetic ammonia which comprises subjecting a nitrogen-hydrogen gas containing inert constituents to catalytic ammonia synthesis in a cyclic gas circulatory system under pressure, diverting a portion of the gas circulating in said system but without release of its pressure, supplying additional quantities of said nitrogen-hydrogen gas to the cyclic system, compressing said diverted gas while still under pressure from the said circulatory system to a greatly increased pressure, subjecting this compressed gas separately from the gas circulating in the aforesaid cyclic system to catalytic ammonia synthesis and ammonia removal, and maintaining the inert content of said cyclic system at a predetermined value by regulating the quantity of said diverted gas.

3. A process for the production of synthetic ammonia which comprises preparing a nitrogen hydrogen gas containing inert constituents from bituminous coal, subjecting said gas to purification treatment until it is of a purity with respect to ammonia catalyst poisons suitable for catalytic ammonia synthesis, introducing the gas thus purified but with its content of inerts substantially unreduced into a cyclic gas circulatory system and therein subjecting it to ammonia synthesis, diverting a portion of the gas circulating in said system, supplying additional quantities of said purified gas to the cyclic system, compressing said diverted gas to a greatly increased pressure, subjecting this compressed gas to catalytic ammonia synthesis and ammonia removal separately from the gas circulating in the aforesaid cyclic system, and maintaining the inert content of said cyclic system at a predetermined value by regulating the quantity of said diverted gas.

4. A process for the production of synthetic ammonia which comprises subjecting a nitrogen-hydrogen gas containing inert constituents at a pressure below about 250 atmospheres to catalytic ammonia synthesis and ammonia removal in a cyclic gas circulatory system, diverting a portion of the gas circulating in said system, supplying additional quantities of said nitrogen-hydrogen gas to the cyclic system, compressing said diverted gas to a pressure above about 250 atmospheres and subjecting this diverted compressed gas separately from the gas circulating in the aforesaid cyclic system to catalytic ammonia synthesis and ammonia removal.

5. A process for the production of synthetic ammonia which comprises subjecting a nitrogen-hydrogen gas containing inert constituents at a pressure below about 250 atmospheres to catalytic ammonia synthesis and ammonia removal in a cyclic gas circulatory system, diverting a portion of the gas circulating in said system, supplying additional quantities of said nitrogen-hydrogen gas to the cyclic system, compressing said diverted gas to a pressure above about 250 atmospheres, subjecting this compressed diverted gas to catalytic ammonia synthesis and ammonia removal separately from the gas circulating in the aforesaid cyclic system, and maintaining the inert content of said cyclic system at a predetermined value by regulating the quantity of said diverted gas.

6. A process for the production of synthetic ammonia from a nitrogen-hydrogen gas containing not less than about 0.5% inert constituents which comprises compressing said gas to a pressure below about 250 atmospheres, subjecting said compressed gas in a cyclic gas circulatory system to catalytic ammonia synthesis, diverting a portion of the gas circulating in said system, supplying additional quantities of said nitrogen-hydrogen gas to the cyclic system, compressing said diverted gas to a pressure above about 500 atmospheres, subjecting this compressed gas to catalytic ammonia synthesis and ammonia removal separately from the gas circulating in the aforesaid cyclic system, and maintaining the inert content of said cyclic system at a predetermined value by regulating the quantity of said diverted gas.

7. A process for the production of synthetic ammonia from a nitrogen-hydrogen gas containing not less than about 0.5% inert constituents which comprises compressing said gas to a pressure below about 250 atmospheres, subjecting said compressed gas in a cyclic gas circulatory system to catalytic ammonia synthesis, diverting a portion of the gas circulating in said system, supplying additional quantities of said nitrogen-hydrogen gas to the cyclic system, compressing said diverted gas to a pressure above about 500 atmospheres, subjecting this compressed gas to catalytic ammonia synthesis and ammonia removal separately from the gas circulating in the aforesaid cyclic system, and maintaining the inert content of said cyclic system below about 10% by regulating the quantity of said diverted gas.

8. In a process of the cyclic type for the catalytic synthesis of ammonia from nitrogen-hydrogen gases under pressure which comprises maintaining the inert content of the circulatory gas system by discharging a portion of the compressed circulating gases and releasing its pressure, that improvement which consists in subjecting said portion of the circulating gases to further treatment after its discharge from the circulatory system but before release of its pressure, said treatment comprising compressing said portion of the circulating gases to a substantially higher pressure and subjecting it under the increased pressure to renewed catalytic treatment for the production of synthetic ammonia therefrom and removal of synthesis ammonia separate from the gas undergoing treatment in the aforesaid circulatory gas system.

9. A process for the production of synthetic ammonia which comprises subjecting a nitrogen-hydrogen gas containing inert constituents to catalytic ammonia synthesis in a cyclic gas circulatory system under pressure, diverting a portion of the gas circulating in said system and subjecting said diverted portion of gas to catalytic ammonia synthesis and ammonia removal in a second cyclic gas circulatory system separately from the gas circulating in the aforesaid cyclic system.

10. A process for the production of synthetic ammonia which comprises subjecting a nitrogen-hydrogen gas containing inert constituents to catalytic ammonia synthesis in a cyclic gas circulatory system under pressure, diverting a portion of the gas circulating in said system and supplying additional quantities of said nitrogen-hydrogen gas to the cyclic system in regulated quantity thereby maintaining the inert content of said cyclic system at a predetermined value, and subjecting the diverted portion of gas to catalytic ammonia synthesis and ammonia removal in a second cyclic gas circulatory system separately from the gas circulating in the aforesaid cyclic system.

HENRY S. LOUD.